350-6.3 SR
XR 3,346,739
[redacted]
SEARCH ROOM

SUBSTITUTE FOR MISSING XR

Oct. 10, 1967 K. W. JENKNER 3,346,739

PHOTOSENSITIVE CHARACTER READING APPARATUS

Filed May 18, 1964 3 Sheets-Sheet 1

INVENTOR.
KURT W. JENKNER

BY

PHOTOSENSITIVE CHARACTER READING APPARATUS

Filed May 18, 1964 3 Sheets-Sheet 2

INVENTOR
KURT W. JENKNER
BY

PHOTOSENSITIVE CHARACTER READING APPARATUS

Filed May 18, 1964 3 Sheets-Sheet 3

INVENTOR.
KURT W. JENKNER

BY 3,346,739

PHOTOSENSITIVE CHARACTER READING APPARATUS

Kurt W. Jenkner, Vestal, N.Y., assignor to General Precision Systems Inc., a corporation of Delaware Filed May 18, 1964, Ser. No. 367,988
10 Claims. (Cl. 250—219)

ABSTRACT OF THE DISCLOSURE

An optical system including a movable lens, a fixed receptor, and a plurality of reflectors defining an optical path between the lens and receptor. By moving certain reflectors relative to both the lens and receptor, the optical path length is maintained constant despite displacement of the lens.

This invention relates to character reading apparatus and, more particularly, to improved apparatus for scanning documents, such as printed pages, to derive suitable input signals for character recognition logic circuits.

While character recognition is widely employed to read characters printed (or otherwise formed) on such diverse documents as bank checks, credit card invoice slips, cash register tally rolls and teletypewriter tape, more, and possibly most, of the information which it would be desirable to read automatically is printed or typed on pages, such as letter-size sheets. In order to read the information on such pages it is necessary, of course, to scan and analyze the characters successively, character after character, and line after line. Character recognition apparatus commonly includes a scanning station and document handling apparatus which transports the document to be read to the scanning station so that individual characters pass successively past the scanning station. A photoelectric light-sensitive receptor or transducer scans a predetermined area at the scanning station and generates electrical output signals corresponding to the character present at any given instant within the predetermined area.

A variety of scanning systems and transducers converting light to electrical signal have been utilized, including as examples, a phototube arranged to receive light reflected from the document as the tube is being moved over the surface thereof, or a flying spot scanner may illuminate the character area with a beam of light while the phototube is stationary. Also rows or matrices of photosensitive elements, such as photodiodes have been arranged to view the character area while characters are successively transported into the viewing range of such elements.

A usual requirement for mechanized page reading is that the data be read in the same sequence in which it ordinarily is written, i.e., from left to right along each line, taking one line at a time. Thus a requirement for most page-reading machines is a capability of locating images of successive characters in successive lines of print at a predetermined area which is viewed or scanned by some form of photoelectric receptor. Inasmuch as the electronic scanning and recognition circuitry available for optical reading equipment is capable of recognizing many hundreds of characters per second, the speed at which pages may be read is presently limited principally by the mechanical means utilized to present successive characters to the photoreceptor.

It will be apparent that the reading of a complete page of characters, one at a time, requires the provision of relative movement between the optical pickup unit and the document, (1) in a first coordinate, in order to read successive characters in any given line, and (2) in a second coordinate, in order to read successive lines of the document. Photoelectric transducers of the photodiode type are delicate assemblies and require a number of electrical connections. Consequently, it is desirable that they be stationary and that the two relative motions required to read a page be provided by moving the document rather than by moving the transducer.

Document transport apparatus which is capable of positioning a document rapidly and accurately enough in two coordinates has been unavailable, however, and, if available, apparently would be extremely complex and expensive. Hence, in accordance with the present invention, images of successive characters on an entire page are presented to a stationary photoreceptor assembly by moving the document in one required relative motion, and by displacing an optical image forming element and an optical system, interposed between the document and the stationary photoreceptor, to accomplish the other required relative motion.

By way of example, in a preferred embodiment of the present invention, the document to be scanned and read is secured to a rotating drum and an image-forming lens of fixed focal length and a reflector therefor are movably mounted on a track which is fixed parallel to the longitudinal axis of the drum. Also, movably mounted on the track is a reflector assembly which, together with the lens, comprises the optical system which projects the character image onto a stationary photoreceptor. Consecutive lines of characters on the document are successively scanned by successive stepping of the optical system from line-to-line.

The print reading apparatus to which the present invention is particularly applicable converts the printed characters by electronic means into digital waveforms characteristic of each letter and compares the waveforms so produced with stored waveforms representing the characters of the machine vocabulary. The digital recognition is based upon the analysis of the differences between the scanning-derived waveform and the waveform of stored characters. While operations of the above type represent a complex system of electromechanical components, the present invention is concerned chiefly with the optical arrangement for scanning of the document to be read.

It is a primary object of the invention to provide an optical line scanner which permits the projection of the image produced by a moving optical element onto a stationary light sensor with substantially uniform intensity and image sharpness.

It is a further object of the invention to provide, in an optical scanning system utilizing image projection of printed characters between a traveling optical image-forming element of predetermined focal length and a stationary photoelectric receptor, simple means for maintaining the effective focal distance substantially constant irrespective of the relative displacement between the moving and stationary elements of the system.

It is a particular feature of the invention that in the scanning apparatus the compensation of the optical path length is effected by simple mechanical means requiring the displacement of only two image reflecting elements.

Other objects and features will be apparent from the following description of the invention, pointed out in particularity in the appended claims, and taken in connection with the accompanying drawings in which:

Figure 1:
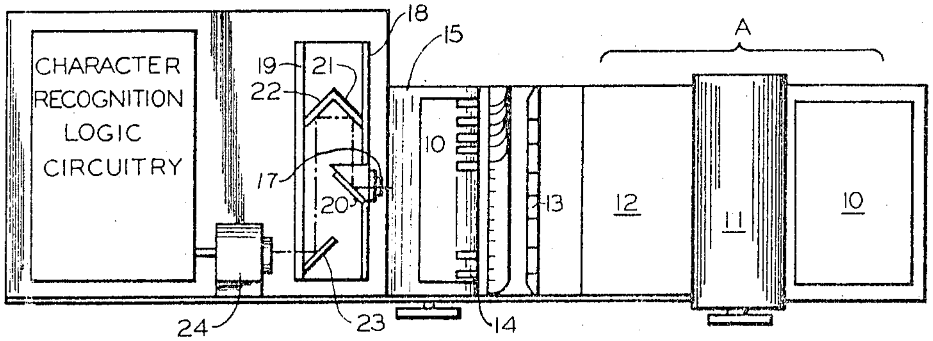
FIG. 1 is a schematic plan view showing the general arrangement of the major components of a character reading apparatus.

As stated before, the present invention is directed to the scanning system of a character reading apparatus, and particularly to the optical image transfer thereof. However, mention will be made briefly of the overall arrangement of the major components. It consists, as depicted in FIG. 1, of a document feed portion A, the purpose of which is to place, in rapid sequence, a sheet to be read from a stack of documents 10 by means of a feed cylinder 11 onto a feed-board 12, and from it, by means of suitable guide rollers 13 and pickoff fingers 14, onto the surface of the scanning drum 15. Various types of sheet feeding and guiding mechanisms may be chosen to perform this function. However, a preferred embodiment for a document transport apparatus performing this function is described in appl. Ser. No. 241,222, filed Nov. 30, 1962, now Patent No. 3,166,310, by Raymond E. Kittredge and assigned to the assignee of the present invention.

Adjacent to the drum 15 is the optical scanning apparatus which forms the subject matter of the present invention. It consists, as to its essential elements, of the lens 17 which is directed toward the drum 15 and is arranged to move over suitable tracks along the longitudinal axis thereof. The images formed by the lens represent the characters to be read on the page 10 carried on drum 15. These images are transferred by optical means consisting of mirrors 20, 21, 22 and 23 onto a photo-receptor 24. The latter is stationary and may be of any suitable type of light-responsive electrical device such as a phototube, a photomultiplier tube, or a bank of photodiodes, depending upon the system employed for translating the voltages or currents produced by the light variations into useful signals for transmission into the character recognition logic circuitry to which the photoreceptor is connected. For the sake of uniformity the term "photoreceptor" has been chosen to represent any one of the various types of light-sensitive transducers which may be used.

As mentioned before, in some character reading systems the photoreceptor element generally comprises a bank of photodiodes which requires a great number of conductive electrical connections. It is, therefore, impractical to place these diodes on a moving carriage for the scanning function. Since these must remain stationary, it becomes necessary to provide an optical image transfer which presents an image of the characters to be recognized in sharp focus on the receptor element. This is the function of lens 17 and mirrors 20–23.

As shown in the above-mentioned Kittredge application drum 15 may be provided with a plurality of apertures and a source of vacuum to hold a document wrapped around the drum, and fingers 14 may operate to strip the document from the drum after the document has been scanned. It is practical, of course, to place the document over the drum 15 in such a manner that the parallel lines of the letters type or printed thereon are transverse to the axis of the drum 15, so that rotation thereof brings into view of the lens 17 the individual letters in succession as they appear in one line. This is the first coordinate of motion in the scanning of the document. For the reading of the next line, however, either drum 15 or the lens 17 must be displaced along the longitudinal axis. This represents the second coordinate of motion in the document scanning.

The line-to-line displacement of the drum 15 would represent a far too complicated mechanical problem. Consequently, the lens 17 is arranged to move along the longitudinal axis, step-by-step, from line-to-line over the printed page. Any displacement of the lens 17, however, were it not for the present invention, would cause a change in the focusing of the image onto the photoreceptor 24, since, while the lens 17 is moving, the receptor 24 remains stationary. The optical arrangement and mechanical coordination herein shown solves this problem by maintaining the optical path between the lens 17 and the receptor 24 constant at the pre-set focus during the line-to-line displacement of the lens 17 along the second coordinate over the entire length of its travel.

Figure 2:
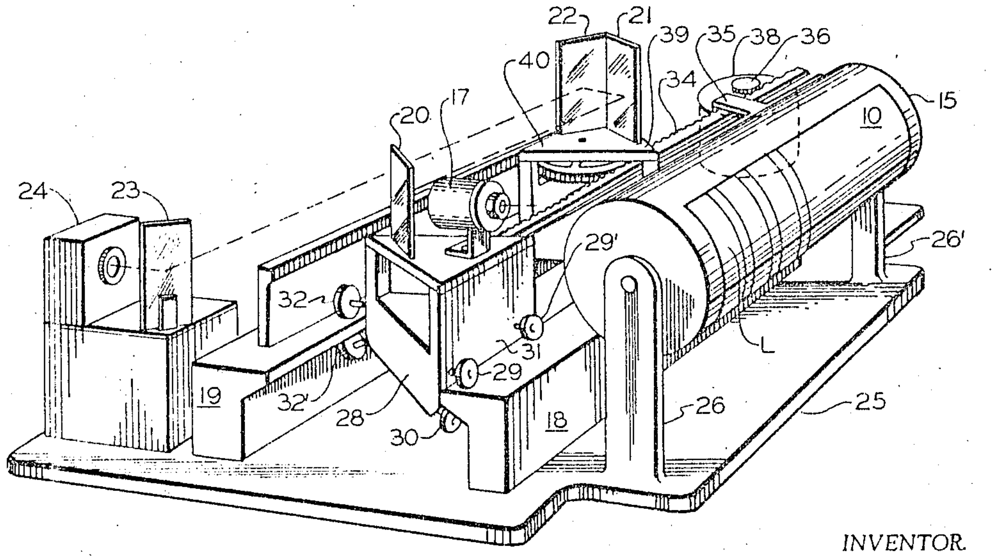
FIG. 2 is a perspective view showing the component assembly of the scanning portion of the apparatus.

Referring to FIG. 2, the general arrangement of the scanning apparatus is seen in perspective. Mounted on the base 25 is the document supporting drum 15 journalled between supports 26 and 26'. The power means for rotating the drum 15 at the given speed is not shown since this portion of the operation is not part of the present invention. As pointed out before, the rotation of the drum 15 represents one of the scanning coordinates in that the lens 17 facing the drum 15 will image the characters consecutively appearing in the line L of the document 10.

The lens 17 is mounted on the upper platform of a triangularly-shaped carriage 28 having a set of upper rollers 29 and 29' and a set of lower rollers 30 and 30' (not shown) extending from the base 31 thereof and resting on an L-shaped track 18 mounted on the base 25. A similar track 19 parallels the track 18 and supports the carriage 28 by means of upper roller 32 and lower roller 32' attached to the apex of carriage 28. Thus, a pair of rollers 29 and 29' ride the upper surface of the track 18, whereas another pair of rollers 30 and 30' ride the lower surface of the leg. This assures the required stability for the support of the carriage 28. As clearly shown in FIG. 2 the lower surfaces of the legs of tracks 18 and 19 are tapered, so that carriage 28 (and carriage 39) are constrained to move strictly parallel to the drum axis. The use of the rollers as shown allows the carriages to move with much less friction than that which conventional sliding ways would provide. The rollers 32 and 32' at the apex of the carriage 28 embrace the leg of the track 19 in the same manner. The displacement of the carriage 28 over the tracks 18 and 19 is effected by the rack 34 which is attached at one end to the carriage 28 and is slidably supported in the guide 35 affixed to the track 18. The pinion 36 of the motor 38, meshes with the rack 34 so that upon rotation the carriage 28 is moved over the tracks 18 and 19.

A second carriage 39, hereinafter referred to as the mirror carriage, is identical in construction with the carriage 28 and is also supported on rollers in the same manner on the tracks 18 and 19.

Figure 4:
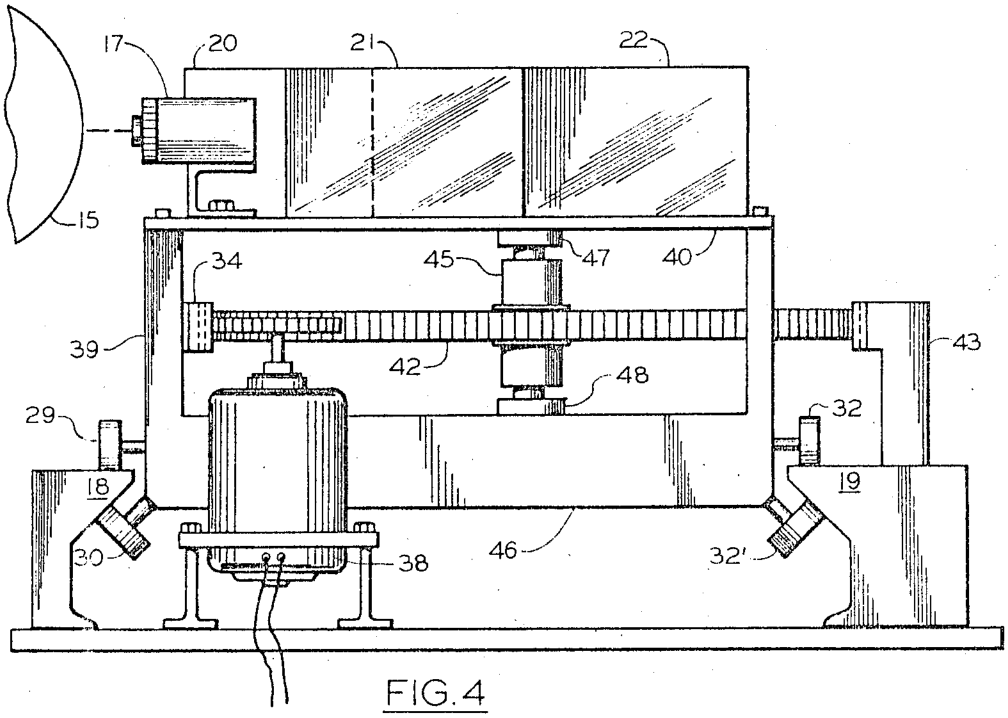
FIG. 4 is a side elevational view of the assembly shown in FIG. 3.

The rollers of mirror carriage 39 are referenced with the same reference characters as that of the lens carriage 28 except with the addition of the letter suffix *b* (FIG. 4). Placed side by side, the carriages 28 and 39 form, by virtue of their triangular shape, a parallelogram which permits the minimum distance of separation between the optical elements carried by them.

Figure 3:
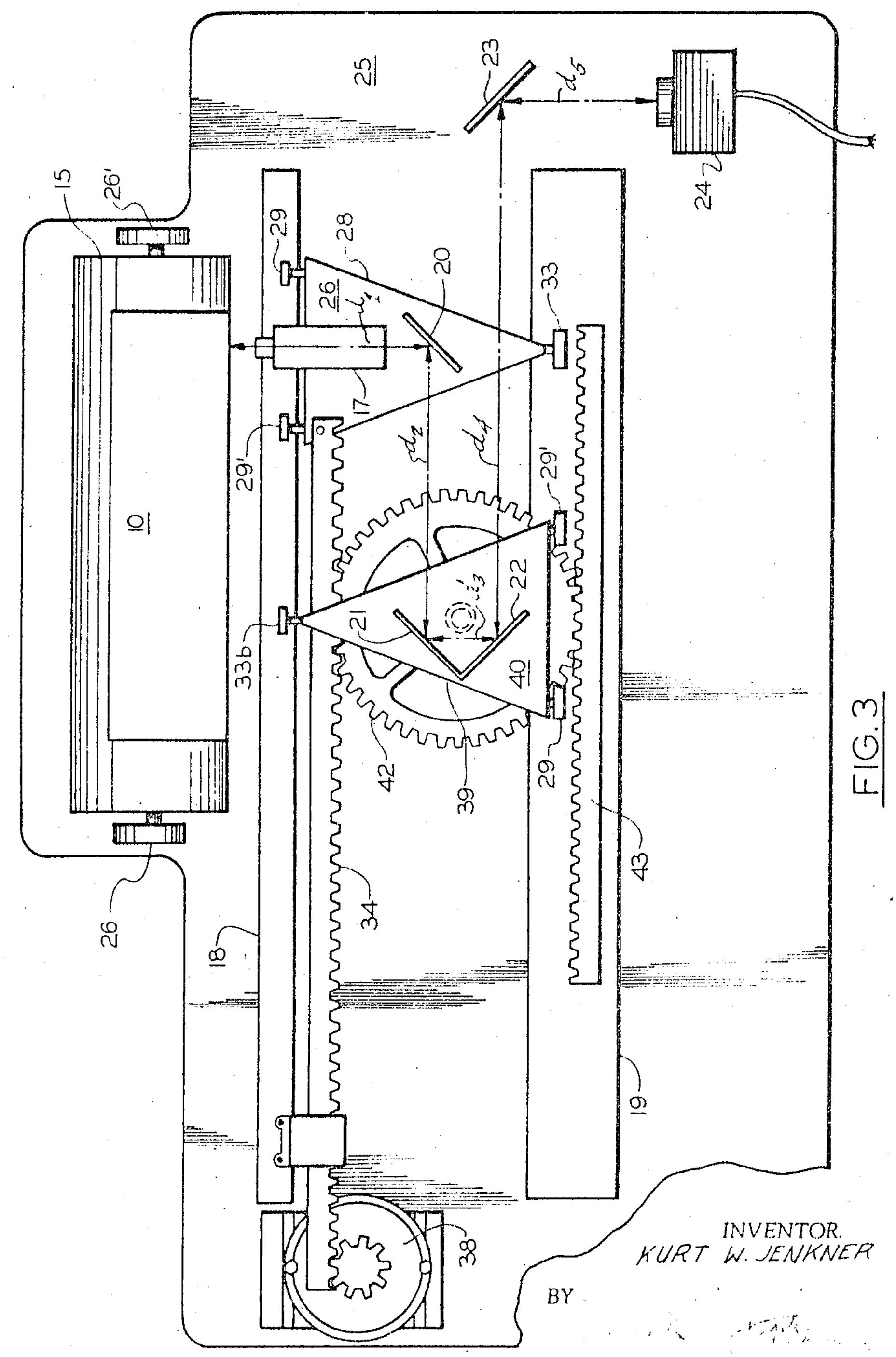
FIG. 3 is an enlarged plan view of the scanning assembly.

As seen in FIG. 3, the four mirrors of the optical system comprise the mirror 20 which, together with the lens 17, rides on the platform 26 of the carriage 28 and is tilted to direct the light beam parallel to the drum axis and toward mirror 21 mounted on the platform 40 of mirror carriage 39. Mirror 22, also mounted on mirror carriage 39 and arranged perpendicularly to mirror 21, serves to direct the light beam from mirror 21 along a further path parallel to the path between mirrors 20 and 21, but in the reverse direction and offset therefrom, toward mirror 23, which is fixedly mounted on base 25. Stationary mirror 23 is arranged to direct the beam onto the stationary photoreceptor 24.

The path of the beam of light between the various mirrors is better indicated by the arrows in FIG. 3. The distance which the light must travel from the lens 17 to the receptor 24 is equal to the sum of the following distances: $d_1$, the distance between the lens 17 and the mirror 20; $d_2$, the distance between the mirrors 20 and 21; $d_3$, the distance between the mirrors 21 and 22; $d_4$, the distance between the mirrors 22 and 23'; and $d_5$, the distance between the mirrors 23 and the image receiving surface of the receptor 24. The sum of these distances is the proper focal length of the lens 17 for the projected image to be in sharp focus at photo-receptor 24.

As long as lens 17 is stationary, which is the case when a simple given line of the document is being scanned, the light path remains unchanged. However, in order to scan other lines on the document, it will be seen that lens 17 must be displaced to other positions which are different distances from mirror carriage 39. The displacement of the lens 17 shortens the distance $d_2$ between the mirrors 20 and 21, which would progressively degrade the sharpness of the image on the receptor 24.

In order to compensate for the change in the light path caused by the displacement of the lens 17, means are provided to move the mirror carriage 39 in unison with the movement of the lens carriage 28. For this purpose, pinion 42 is journalled in mirror carriage 39 engaging both slidable rack 34 and stationary rack 43, which is fixedly attached to track 19. As the rack 34 is driven leftwardly in FIG. 3 by motor 38, it turns pinion 42, causing it to ride on rack 43 in the direction of displacement of the carriage 28.

FIG. 4 shows the construction of mirror carriage 39 comprising a U-shaped base portion 46 to which is secured the platform 40. Shaft 45 of pinion 42 rotates in bearings 47 and 48. The cutout formed by the U-shaped construction permits entry of a portion of the pinion 42 under the platform 26 of lens carriage 28 so that the two carriages may be placed closely adjacent each other at one end of their path of travel.

Leftward movement of the mirror carriage 39 in FIG. 3 increases the length of portions $d_2$ and $d_4$ of the light path, whereas such movement of lens carriage 28 decreases the light path $d_2$. It will be seen that in order to maintain the sum of the distances of the light path constant, the diminishing distance $d_2$, due to the displacement of the lens carriage 28, should equal the increase in the distance $d_4$. The distances $d_1$, $d_3$, and $d_5$ remain constant since their respective optical elements remain stationary.

Displacement of the lens carriage 28 alone would change only distance $d_2$, while displacement of mirror carriage 39 alone would change both distances $d_2$ and $d_4$. Consequently, for maintaining the sum of the distances $d_2$ and $d_4$ constant, mirror carriage 39 must be displaced only half the distance of the displacement of lens carriage 28. This is accomplished by the double rack and pinion drive comprising racks 34 and 43 and pinion 42. This functions effectively as a second class lever to transport the mirror carriage 39 one-half the distance through which the lens carriage 28 is transported by the sliding rack 34.

Figure 5:
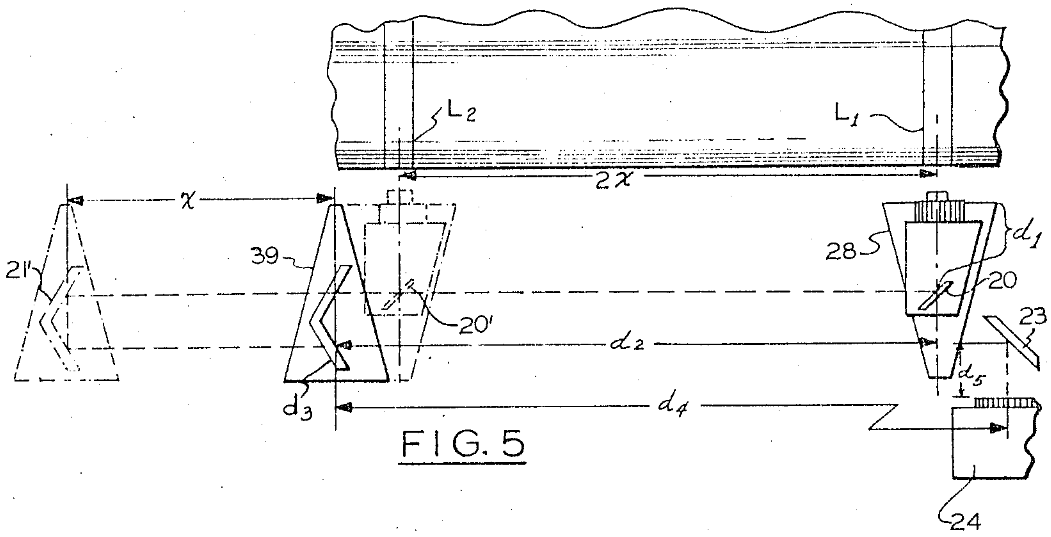
FIG. 5 is a schematic explanatory view of the function of the optical elements of the scanning system.

The diagrammatic view of FIG. 5 illustrates on an enlarged scale the relative displacement of lens carriage 28 and mirror carriage 39 from one line to a second line to be scanned. Solid lines represent the positions of the carriages 28 and 39 as line $L_1$ is being scanned, and dashed lines represent the positions of the same elements as line $L_2$ is being scanned. The optical path length of the projected image as line $L_1$ is being scanned comprises the distances $d_1+d_2+d_3+d_4+d_5$, which is the total optical distance from the document to the stationary photoreceptor 24. After the line is scanned, the lens carriage 28 is moved by a line sensor (not shown here) by translation of rack 34 through a distance $2x$ to scan the next successive line $L_2$. The new position of the lens carriage 28 is shown in dashed lines. Simultaneously the mirror carriage 39 will be moved a distance $x$ (which is one-half the distance $2x$ through which lens carriage 28 has been moved) to the position shown in dashed lines. Thus, as the lens and mirror carriages are moved to scan line $L_2$ the distance $d_4$ between mirrors 22 and 23 will be increased by a distance $x$, while the distance $d_2$ between mirrors 20 and 21 will be decreased by the distance $x$. The distance between the mirrors 21′ and 20′ equals $(d_2-2_x)+x$. Therefore, the total length of the optical path when the lens carriage is in position to view line $L_2$ equals $d_1+(d_2-2_x)+x+d_3+d_4+x+d_5$ or which equals $d_1+d_2+d_3+d_4+d_5$. Thus it is seen that the optical path length of the transmitted image will remain constant, since any increase or decrease in the distance $d_4$ will be compensated by an equal and opposite decrease or increase in the distance $d_2$.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

The embodiments of the invention in which an exclusive property or privilege is claimed are defined as follows:

1. In an optical scanning system for the projection of images of characters distributed in one spacial coordinate onto a stationary photoelectric receptor: an optical-image-forming element of predetermined focal length mounted for displacement along said coordinate; means for displacing said element in successive steps along said coordinate; means for focusing the optical image formed by said element upon said receptor including a plurality of reflectors in the light path between said element and said receptor; and means operative concomitantly with said displacement means to displace certain of said reflectors relative to both said element and receptor to maintain substantially constant and equal to the element focal length the distance between said moving element and said stationary receptor.

2. In an optical scanning system for the projection of images of characters distributed in one spacial coordinate unto a stationary photoelectric receptor: an optical-image-forming element including a lens of predetermined focal length mounted for displacement along said coordinate; means for displacing said element in successive steps along said coordinate; means for focusing the optical image formed by said lens upon said receptor, including a plurality of reflectors in the light path between said lens and said receptor; and means operative concomitantly with said displacing means to displace certain of said reflectors relative to both said element and receptor to maintain substantially constant and equal to the lens focal length the distance between said moving lens and said stationary receptor.

3. In a scanning system for optical presentation of the printed characters of a documented placed on a support onto a stationary photoelectric receptor located at a distance therefrom: a fixed-focus optical-image-forming lens mounted adjacent said support for movement along one scanning coordinate; a plurality of reflecting surfaces forming a light path between said lens and said receptor, the length of said light path being substantially equal to the focal length of said lens, one of said reflecting surfaces being mounted for conjoint movement with said lens during scanning operation; and means operative concomitantly with movement of said lens for displacing certain other of said reflecting surfaces relative to, and in a predetermined proportion to the displacement of, said first reflecting surface for maintaining substantially constant the overall length of said light path between said lens and said receptor.

4. In a scanning system for optical presentation of the printed characters of a document placed on a support onto a stationary photoelectric receptor located at a distance therefrom: a fixed-focus optical-image-forming lens mounted adjacent said support for movement along one scanning coordinate; a plurality of reflecting surfaces forming a light path between said lens and said receptor, the length of said light path being substantially equal to the focal length of said lens, one of said reflecting surfaces being attached to said lens for simultaneous displacement therewith during scanning operation; and means for displacing certain other of said reflecting surfaces in the direction of said coordinate relative to, and in a predetermined ratio to the displacement of, said first reflecting surface for maintaining substantially constant the overall length of said light path between said lens and said receptor.

5. In a scanning system for optical presentation of the printed characters of a document including, in combination, a movable optical-image-forming lens: a support for carrying a document, said support being movable in a first coordinate for the presentation of successive characters forming a line of such a document; means for moving said lens in a second coordinate transverse to said first coordinate for scanning of successive lines of such a document; a stationary photoelectric receptor; and optical means defining an optical path of constant length equal to the lens focal length between said movable lens and stationary receptor, said optical means comprising:

a plurality of reflectors for conveying an image from the lens to the receptor, respective reflectors being fixed with respect to said lens and movable relative to one another; and means intercoupled with said moving means for displacing one of said reflectors in the direction of said second coordinate at a fixed ratio with respect to the scanning movement of said lens.

6. In a scanning system for the optical presentation of the printed characters of a document including, in combination, an optical-image-forming lens mounted on a carriage; a document support mounted for movement in the direction of a first coordinate for presentation of successive characters forming a line of a document supported thereby; means for moving said carriage in the direction of a second coordinate transverse to said first coordinate for the scanning of successive lines of a document on the document support; a stationary photoelectric receptor; and optical means for projecting the image formed by said movable carriage-mounted lens onto said stationary receptor comprising:

a first mirror attached to said carriage and tilted at an angle for reflecting the light from said lens in a direction parallel to said second coordinate, the distance between said lens and said first mirror representing a first optical path; a second carriage displaceable in the direction of said second coordinate; a second mirror mounted on said second carriage and tilted to reflect the light from said first mirror in a direction transverse to said second coordinate; a third mirror mounted on said second carriage and tilted to reflect the light from said second mirror in a direction parallel to said second coordinate and opposite to the movement of said first carriage, the distance between said first and second mirrors representing a second optical path and the distance between said second and third mirrors representing a third optical path; a fourth stationary mirror adjacent said receptor and tilted to reflect the light from said third mirror onto said receptor, the distance between said third and fourth mirrors representing a fourth optical path and the distance between said fourth mirror and said receptor representing a fifth optical path, the sum of the distances of said optical paths being equal to the focal distance of said lens; means for moving said first carriage in said second coordinate direction toward said second carriage thereby altering said second optical path; and means for moving said second carriage relative to said first carriage thereby altering the fourth optical path, the ratio of displacement between said carriages being such as to maintain the sum of the distances of said optical paths substantially constant within the extent of scanning travel of said first carriage.

7. A scanning system in accordance with claim 6 wherein the travel of said carriage decreases the length of said second optical path and the travel of said second carriage compensatingly increases the length of said fourth optical path.

8. A scanning system in accordance with claim 6 wherein the relative displacement between said first and second carriages is at a ratio of 2 to 1, respectively, over the scanning travel of said lens.

9. In an apparatus for reading successive characters arranged on a document in substantially parallel lines extending in a first direction laterally across said document with successive lines spaced in a second direction transverse to said first direction; a platform; a rotating drum adapted to support such a document placed thereon with the lines transverse to the axis thereof whereby the rotation of said drum corresponds to said first direction, whereas the longitudinal axis of said drum extends in said second direction; a pair of vertically extending supports affixed to said platform, said supports forming a pair of parallel tracks; a first carriage having rollers adapted to travel over said tracks; a lens mounted on said carriage and directed toward said drum for imaging the characters of a document thereon; a rack attached to said carriage and slidably supported over said track; motor means for moving said rack and said carriage in said second direction; a photoelectric receptor affixed to said platform; a second carriage adjacent to said first carriage having rollers slidable over said tracks; a stationary rack parallel to said movable rack; a pinion engaging said racks; said pinion being journalled in said second carriage, whereby movement of said slidable rack constrains said pinion to travel over said stationary rack and thus displace said second carriage; and optical reflector means mounted on said second carriage directing the light received from said lens onto said receptor, the displacement of said second carriage being so proportioned with respect to the displacement of said first carriage as to maintain the optical path between said lens and said receptor substantially constant over the scanning travel of said lens.

10. Apparatus in accordance with claim 9 wherein said carriages are triangularly shaped and placed on said tracks with their apicies extending in opposite directions to allow close positioning of said carriages in abutting relationship.

References Cited

UNITED STATES PATENTS

| | | | |
|---|---|---|---|
| 2,792,448 | 5/1957 | Deuth et al. | 250—235 X |
| 2,823,580 | 2/1958 | Gannett. | |
| 3,031,076 | 4/1962 | De Claris et al. | 250—219 X |
| 3,205,367 | 9/1965 | Whitesell | 250—235 |

WALTER STOLWEIN, *Primary Examiner.*